United States Patent [19]

McGrath, Jr.

[11] Patent Number: 5,145,297
[45] Date of Patent: Sep. 8, 1992

[54] SYSTEM AND METHOD FOR PARTICULATE MATTER REMOVAL

[75] Inventor: Patrick J. McGrath, Jr., Fullerton, Calif.

[73] Assignee: Northrop Corporation, Hawthorne, Calif.

[21] Appl. No.: 610,185

[22] Filed: Nov. 7, 1990

[51] Int. Cl.⁵ .................. B23C 9/00; B23Q 11/02
[52] U.S. Cl. .................. 409/132; 15/1.51; 15/309.1; 15/420; 409/137
[58] Field of Search .................. 409/137, 131; 408/67, 408/710, 241 R; 15/1.51, 345, 405, 309.1, 309.2, 422.1, 420, 339, 308, 309, 345, 1.52; 144/252 R, 252 P

[56] References Cited

U.S. PATENT DOCUMENTS

| | | | |
|---|---|---|---|
| 3,107,386 | 10/1963 | Mandin | 15/345 |
| 4,037,982 | 7/1977 | Clement | 409/137 X |
| 4,044,423 | 8/1977 | Gairdelli | 15/345 |
| 4,313,767 | 2/1982 | Bemis et al. | 15/1.51 X |
| 4,457,043 | 7/1984 | Oeberg et al. | 15/346 |
| 4,575,290 | 3/1986 | Adair | 409/137 X |
| 4,671,708 | 6/1987 | Hurd | 15/345 X |
| 4,727,614 | 3/1988 | Swistun | 15/309.2 |
| 4,751,759 | 6/1988 | Zoell | 15/345 X |
| 4,822,219 | 4/1989 | Wood et al. | 408/67 |
| 4,835,808 | 6/1989 | Hahne et al. | 15/1.51 |
| 4,934,016 | 6/1990 | Kälin | 15/309.1 |

FOREIGN PATENT DOCUMENTS

| | | | |
|---|---|---|---|
| 1248896 | 8/1967 | Fed. Rep. of Germany | 15/420 |
| 2948475 | 6/1981 | Fed. Rep. of Germany | 15/345 |
| 145102 | 12/1978 | Japan | 15/345 |
| 638325 | 12/1978 | U.S.S.R. | 15/345 |
| 198780 | 6/1923 | United Kingdom | 15/345 |
| 597752 | 2/1948 | United Kingdom | 15/420 |
| 611177 | 10/1948 | United Kingdom | 15/345 |

Primary Examiner—William Briggs
Attorney, Agent, or Firm—Terry J. Anderson; Robert B. Block; Karl J. Hoch, Jr.

[57] ABSTRACT

A system and method for removing particulate matter from an object being machined or having been machined. A vacuum tube is connected to a source of vacuum and has an intake end adapted to be placed in close proximity to the object being machined. In one embodiment the intake end has a slot such that the intake end can at least partially surround a machining tool. In another embodiment the intake end has standoff buttons that are placed against the object. The vacuum tube can have an inlet cone with a bellmouth shape. Ionized gas is directed at the area proximate the inlet cone and/or machining tool. A vibrator can also be used to vibrate the object.

14 Claims, 4 Drawing Sheets

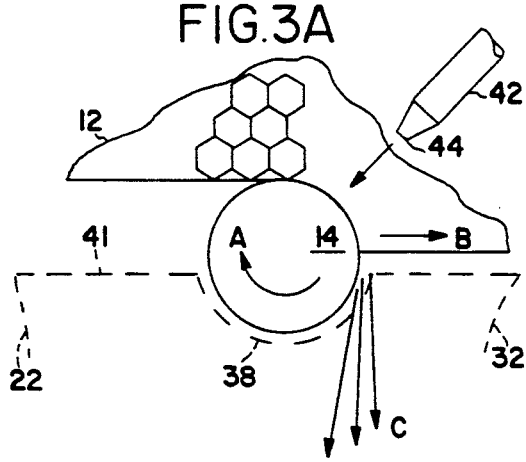
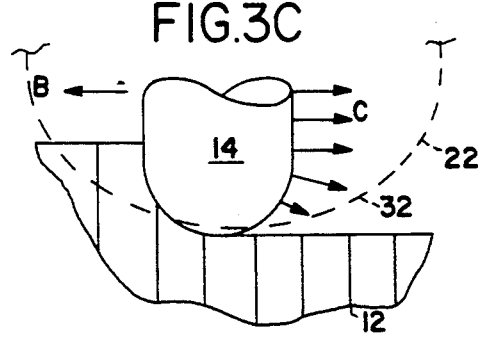
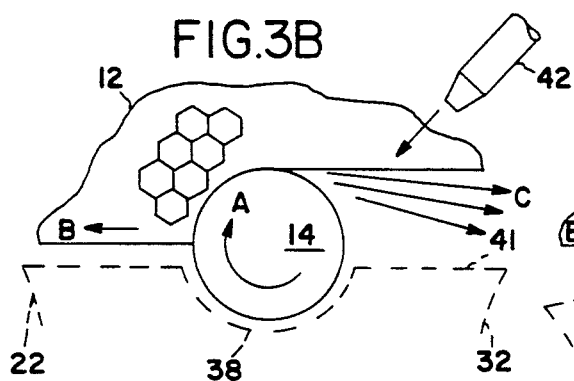
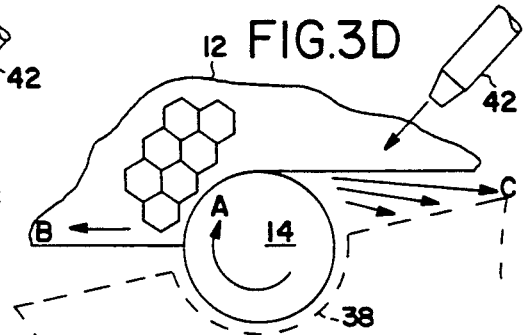
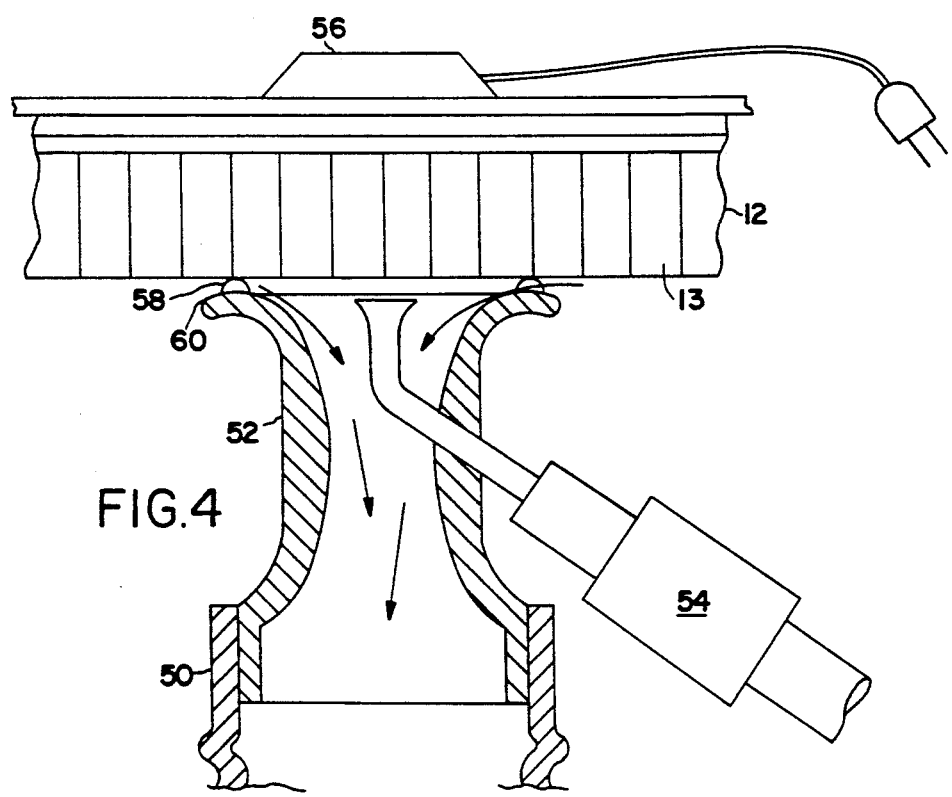

SYSTEM AND METHOD FOR PARTICULATE MATTER REMOVAL

BACKGROUND OF THE INVENTION

1. Field of the Invention

The present invention relates to cleaning an object and, more particularly, to vacuuming particulate matter from an object either being or having been machined.

2. Prior Art

Using a vacuum to clean objects is generally old in the art. Various U.S. patents have involved improvements in general cleaning and also in vacuum cleaning. U.S. Pat. No. 3,071,497 to Hinson discloses dust removal by blowing ionized air onto a workpiece followed by vibration. U.S. Pat. No. 4,677,704 to Huggins discloses particle removal using a combination of sonic vibration and charge neutralization. U.S. Pat. No. 4,701,973 to McBrady et al. and U.S. Pat. No. 4,727,614 to Swistun disclose the combination of blowing ionized air along with vacuuming. U.S. Pat. No. 4,198,725 to Trutzschler discloses a combination of a vacuum and vibrator.

Although the types of cleaning apparatus and methods described in the above patents are fairly good at cleaning ordinary regular objects, a particular problem has arisen with the machining and cleaning of objects having honeycomb-type structures or structures with areas or pockets that might catch and retain dust or particulate matter. It is therefore an objective of the present invention to provide a new and improved apparatus and method for cleaning objects that might otherwise catch and retain particulate matter within its structure.

SUMMARY OF THE INVENTION

The foregoing problems are overcome and other advantages are provided by a system and method for removing particulate matter from an object either being or having been machined.

In accordance with one embodiment of the present invention, a system for removing particulate matter during a machining process of an object being machined is provided. The machining process has a machine with a rotatable machining tool that can remove portions of the object being machined. The system comprises a source of vacuum, a vacuum tube, means for connecting the vacuum tube to the machine, and means for directing ionized gas at the tool. The vacuum tube is connected to the source of vacuum at a first end and has a second intake end with at least one slot therein such that a portion of the tool can be received in the slot and the intake end can at least partially surround the tool. The means for connecting the vacuum tube to the machine can locate the second intake end in close proximity to the rotatable tool.

In accordance with another embodiment of the present invention, a system for removing particulate matter from an object is provided. The system comprises a source of vacuum, a vacuum tube, and means for directing ionized gas. The vacuum tube is connected to the source of vacuum and has an intake cone with a bellmouth shape. The means for directing ionized gas can direct the gas at an area approximate the intake cone.

In accordance with one method of the invention, a method of removing particulate matter from an object being machined is provided comprising positioning a vacuum inlet in close proximity to a cutting tool of a cutting machine, the inlet having at least one slot therein for at least partially receiving a portion of the cutting tool therein; directing a stream of ionized gas in an area proximate the cutting tool; and catching and vacuum pulling particulate matter cut from the object at the vacuum inlet to thereby reduce later particulate matter removal from the object.

BRIEF DESCRIPTION OF THE DRAWINGS

The foregoing aspects and other features of the invention are explained in the following description, taken in connection with the accompanying drawings, wherein:

FIG. 3A is a schematic top view of an object being machined, a machining tool, the intake cone and gas discharge tube of the machine shown in FIG. 1.

FIG. 3B is a schematic top view as in FIG. 3A showing the machining tool moving relative to the object being machined in an opposite direction from that shown in FIG. 3A.

FIG. 3C is a schematic rear view of the machining tool, object being machined, and intake cone as shown in FIG. 3B. FIG. 3D is a schematic top view of the machining tool, object being machined, and intake cone rotated to better pickup debris when the tool moves as shown in FIG. 3B.

FIG. 4 is a schematic top view of an alternate embodiment of the present invention.

DETAILED DESCRIPTION OF THE INVENTION

Figure 1:
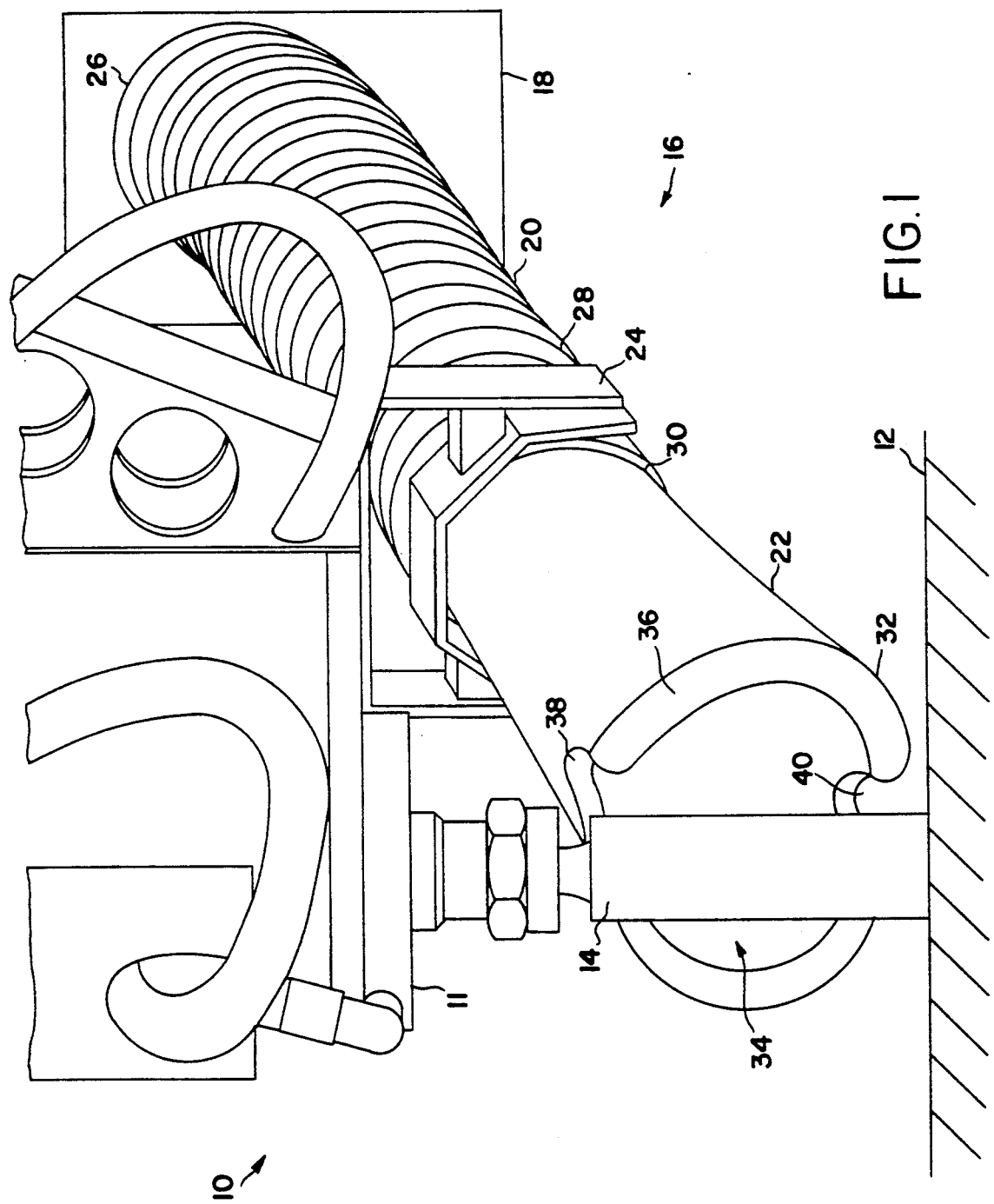
FIG. 1 is a front perspective view of a machine incorporating features of the present invention.

Referring to FIG. 1, there is shown a partial perspective view of a machine 10 adapted to machine a workpiece or object 12. The machine 10 is of conventional design having a motor (not shown) either located in or connected to a machining head 11 which has a machining tool 14 operably connected thereto. Suitable drive means (not shown) are provided to operably move the machining head 11 relative to the workpiece 12 to perform its machining function at various locations of the workpiece 12. In the embodiment shown, the machining tool 14 is provided as a router capable of removing various quantities of material from the workpiece 12. However, any suitable type of machining tool may be provided. The machine 10, in the embodiment shown, comprises a system for removing particulate matter during the machining process of the workpiece 12. The system 16 generally comprises a source of vacuum 18, a vacuum tube 20, an intake cone 22 and a connecting frame 24. The source of vacuum 18 may be comprised of any suitable type of vacuum unit as is known in the art. The vacuum tube 20, in the embodiment shown, is comprised of a flexible conduit having a first end 26 connected to the source of vacuum 18 and a second end 28 connected to a rear end of the intake cone 22. The intake cone 22, in the embodiment shown, has a rear end 30, a front end 32, and an internal conduit 34 therebetween.

Figure 2:
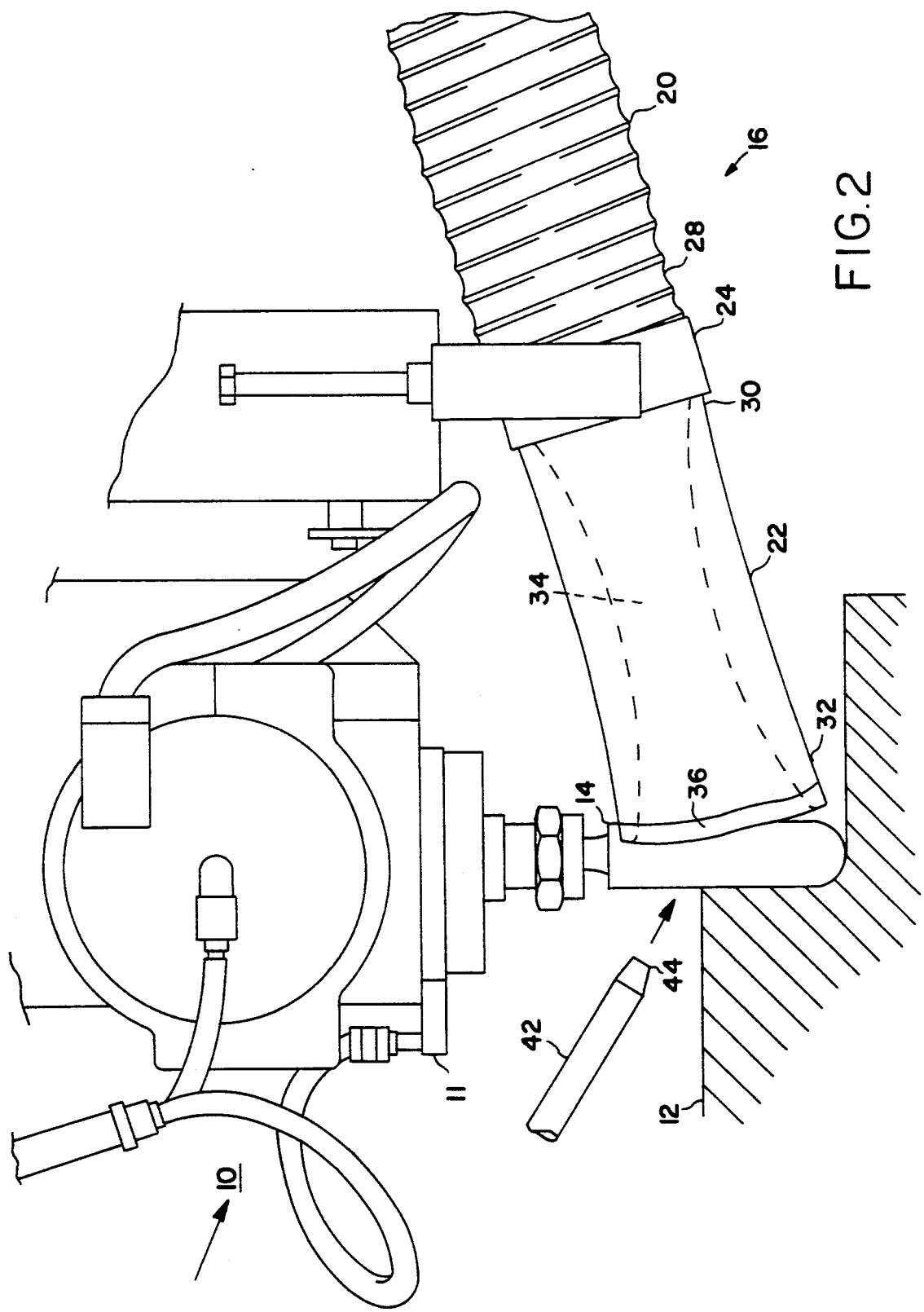
FIG. 2 is a side perspective view of the machine shown in FIG. 1.

Referring also to FIG. 2, there is shown a perspective side view of the machine shown in FIG. 1. In the embodiment shown, the walls of the intake cone 22 have a non-uniform thickness along its length forming a venturi type conduit with a bellmouth shaped front. The rear end 30 of the intake cone 22 and the front end 28 of the vacuum tube 20 are connected to each other and, in turn, connected to the connecting frame 24. The connecting frame 24 is suitably fixedly connected to a portion of the machining head 11 such that as the machining head 11 is moved the intake cone 22 and front end 28 of the vacuum tube are moved therewith. The flexible nature of the vacuum tube 20 allows connection to be maintained with the source of vacuum 18. In the embodiment shown, the intake cone 22 has a protective cover 36 on its front end 32 to prevent damage to the workpiece 12 in the event of inadvertent contact therewith. In a preferred embodiment of the invention, the protective cover 36 is comprised of a suitable material such as nylon. However, any suitable type of material may be used. The front end 32 of the intake cone, in addition to the protective cover 36 also has a longitudinal slot therein comprised of an upper notch 38 and a lower notch 40. The two notches 38 and 40 are suitably sized and shaped to at least partially receive a portion of the machining tool 14 therein. The connecting frame 24 is preferably adjustable to allow for varying the annular positioning of the intake cone 22 relative to the machining tool 14 and also to adjust the positioning of the upper and lower notches 38 and 40 of the front end 32 relative to the machining tool 14.

In the embodiment shown, the machine 10 also comprises a gas discharge tube 42 which is connected to the machining head 11 and is movable therewith. The gas discharge tube 42 is connected to a source of ionized gas, such as nitrogen, and can discharge the gas at outlet end 44. The outlet end 44 can be located about 12 inches away from the tool and can direct the ionized gas towards the machining tool 14 at an area proximate the inlet cone 22; either parallel or perpendicular. In the preferred embodiment shown, the outlet end 44 is located on the opposite side of the machining tool 14 such that the ionized gas heads towards the intake cone 22. Referring also to FIG. 3A, various features of the present invention will be explained. Generally, the machining tool 14 rotates about its axis as indicated by arrow A. The tool 14 is moved relative to the workpiece 12 as indicated by arrow B. Due to the abrasive or cutting nature of the machining tool 14, material is removed from the workpiece 12 in the form of particulate matter. Some of this particulate matter is thrown from the workpiece as shown by arrows C. Due to the close proximity of the intake cone front end 32 relative to the machining tool 14, the discharged particulate matter, as indicated by arrow C, is discharged or thrown into the intake cone 22 and virtually immediately vacuumed up. Of course, not all of the particulate matter generated by the machining process is discharged as indicated by arrows C. It is upon this non-discharged particulate matter that the features of the present invention combine to remove from the workpiece 12. Basically, the combination of features include the close proximity of the intake cone front end 32 to the workpiece 12 and machining tool 14, the venturi shaped internal conduit 34 of the intake cone 22, and the charge neutralization effect of the ionized gas upon particulate matter which is electrostatically attracted to the workpiece 12.

Generally, the ionized gas from the outlet end 44 of the gas discharge 42 can neutralize virtually all electrostatic charge on particulate matter and thus virtually eliminate static charge attraction of particulate matter to the workpiece 12 allowing for easier vacuum removal of this particulate matter. The slot in the front end 32 of the intake cone 22 allows the leading edge 41 of the cone 22 to at least partially overlap the tool 14 without interfering with the tool's operation. Thus, the leading edge 41 of the cone 22 can be placed in very close proximity to the workpiece 12 at the area being machined can be maintained throughout the entire motion of the machining head 11. This close proximity allows a stronger vacuum attraction of particulate matter than could otherwise be provided. Thus, more particularly adapted to capture particulate matter thrown from the workpiece 12 by the tool 14, the venturi shape of the interior conduit 34 of the cone can accelerate vacuum action, at least locally, to insure that particulate matter entering the cone front end 32 is not allowed to exit the front end 32 if excessively heavy, but is instead accelerated such that it can be transported through the entire length of the vacuum tube 20. With reference to FIG. 3B, in the event that rotation A of the tool 14 and movement B of the tool relative to the workpiece 12 causes particulate matter to be thrown in a direction other than directly into the bellmouth of the cone 22, the combination of features can nonetheless capture this thrown matter. Basically, the close proximity of the leading edge 41 to the workpiece 12, the vacuum action, and the pushing action of the ionized gas can, at least partially, redirect the particulate matter from its normal path or debris vector as shown by arrows C, into the cone 22 and removed from the workpiece 12. Referring also to FIG. 3D, there is shown the front end 32 of the intake cone 22 having been rotated, via its connecting frame 24, about the center of tool 14. In this embodiment, the system has suitable means (not shown) to move the connecting frame 24 as shown in order to allow the device to better pickup debris when the debris vector C is parallel to the movement vector B. As can be seen with reference to FIGS. 2 and 3C, the size of the front end 32 of the cone 22 is substantially the same size as the tool 14 such that the entire length of the tool 14 can be used if desired and the features of the present invention can still be provided. The use of the close proximity capture/vacuum cone 22 and static charge neutralization can significantly increase the dust or particulate matter capture rate during the machining process by over 50 percent. This operational gain results in a significantly lower labor and handling time for the final cleaning operation. Heavier particles of fractional inch size and of a geometry which tends to stick in the core are also captured at this stage. Only fine dust remains to be removed; a much simpler and quicker task.

Referring to FIG. 4, there is shown an alternate embodiment of the present invention for use on a workpiece 12 after having been machined. The system comprises a vacuum tube 50 with an intake cone 52, a gas discharge tube 54 projecting into the cone 52 and a vibrator 56. The cone 52 has a venturi shape with standoff buttons 58 on a leading edge 60. The standoff buttons allow the cone 52 to be placed on the workpiece, but still allows air to flow between the workpiece 12 and the leading edge 60. Preferably the vibrator 56 moves with the cone 52 relative to the workpiece 12. The gas discharge tube 54 can direct ionized gas into honeycomb cavities 13 of the workpiece 12 to neutralize static charges of particulate matter in the cavities 13. The vibrator 56 can vibrate the workpiece 12 to further dislodge particulate matter which can then be vacuumed in by the intake cone 52.

Figure 5:
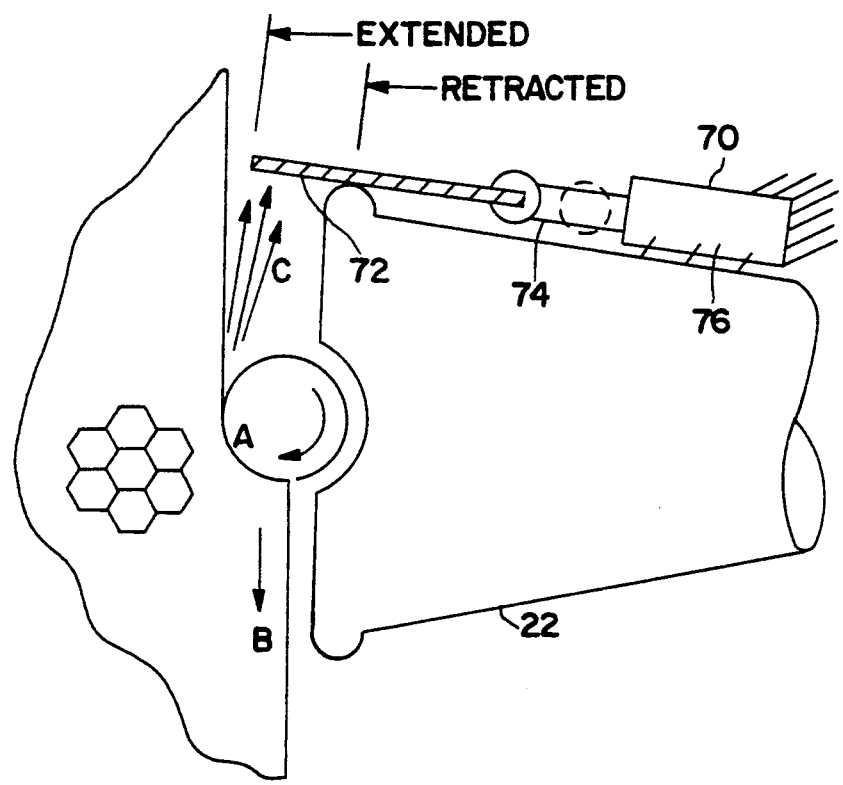
FIG. 5 is a schematic top view of an alternate embodiment of the present invention.

Referring now to FIG. 5, a schematic top view of an alternate embodiment of the invention is shown. In the embodiment shown, the system is essentially the same as the system shown in FIGS. 1 and 2, but also comprises a side capture mechanism 70 connected to the cone 22. The side capture mechanism 70, in the embodiment shown, generally includes a capture plate 72, a drive arm 74 and a solenoid 76. The solenoid 76 is fixedly connected to the cone 22 at one side, and electrically connectable to a power source via a suitable switch (not shown). The drive arm 74 connects the capture plate 72 to the solenoid 76 such that movement of the solenoid 76 can move the plate 72 between a retracted position and an extended position. In a preferred embodiment, the plate 72 is curved to match the curve of the cone 22. Basically, rather than repositioning the cone 22 as shown in FIG. 3D to help collect debris when the debris vector C is generally parallel to the tool movement B, the embodiment shown in FIG. 5 can allow for greater collection by merely extending the plate 72 to its extended position as shown and thereby prevent a substantial amount of debris, that would otherwise not be collected, from passing beyond the effective vacuum range of the cone 22. The plate 72 can, of course, be retracted by the solenoid 76 when the motion B of the tool and cone is reversed. In a preferred embodiment, the solenoid is controlled by a switch that is automatically actuated in response to the direction of tool and cone motion B.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A system for removing particulate matter during a machining process of an object being machined, the machining process having a machine with a rotatable machining tool that can remove portions of the object being machined, the system comprising:
 a source of vacuum;
 a vacuum tube connected to said source of vacuum at a first end and having a second intake end, said intake end having at least one slot therein such that a portion of the tool can be received in said slot and said intake end can at least partially surround said tool;
 means for connecting said vacuum tube to the machine such that said second intake end is located in close proximity to said rotatable tool; and
 means for directing ionized gas at said tool.

2. A system as in claim 1 wherein said vacuum tube intake end has a bellmouth shape.

3. A system as in claim 1 wherein said vacuum tube intake end has a top slot and a bottom slot for receiving a portion of the tool therein.

4. A system as in claim 1 wherein said means for directing ionized gas directs a stream of ionized gas parallel to the travel of the tool relative to the object being machined.

5. A system as in claim 1 wherein said means for directing ionized gas directs a stream of ionized gas perpendicular to the travel of the tool relative to the object being machined.

6. A system as in claim 1 further comprising means to angularly move said vacuum tube intake end to accommodate angular movement of the tool.

7. A system as in claim 1 wherein the machine has a mill head with the tool mounted thereon that can move relative to the object and, the means for connecting said vacuum tube to the machine can move the vacuum tube intake end with the mill head.

8. A system as in claim 1 further comprising an extendable side capture mechanism connected to said tube.

9. A method of removing particulate matter from an object being machined, the method comprising:
 positioning a vacuum inlet in close proximity to a cutting tool of a cutting machine, the inlet having at least one slot therein for at least partially receiving a portion of the cutting tool therein;
 directing a stream of ionized gas at an area proximate the cutting tool; and
 catching and vacuum pulling particulate matter cut from the object at the vacuum inlet to thereby reduce later particulate matter removal from the object.

10. A system for removing particulate matter during a machining process of an object being machined, the machining process having a machine with a rotatable machining tool that can remove portions of the object being machined, the system comprising:
 a vacuum source;
 means for positioning a vacuum inlet connected to the vacuum source in close proximity to a cutting tool of a cutting machine, the inlet having at least one slot therein for at least partially receiving a portion of the cutting tool therein;
 means for directing a stream of ionized gas at an area proximate the cutting tool; and
 means for catching and vacuum pulling particulate matter cut from the object at the vacuum inlet to thereby reduce later particulate matter removal from the object.

11. A system for removing particulate matter from a machined workpiece comprising:
 a source of vacuum;
 a vacuum tube connected to the vacuum source at a first end of the vacuum tube away from the machined workpiece and having a second end adjacent to the machined workpiece;
 an intake cone connected to the second end of the vacuum tube, the intake cone contacting the machined workpiece and having a venturi shape, a leading edge, and standoff buttons on the leading edge such that air can flow between the machined workpiece and the leading edge;
 means for directing a stream of ionized gas into honeycomb cavities of the machined workpiece, the stream of ionized gas neutralizing static charges of the particulate matter in the honeycomb cavities; and,
 means for vibrating the machined workpiece, the vibrating means being in contact with an upper surface of the machined workpiece opposite from the intake cone, the vibration dislodging the particulate matter from the machined workpiece, the dislodged particulate matter being vacuumed in by the intake cone during operation of said vibrating means and the vacuum source.

12. A method of removing particulate matter from a machined workpiece, comprising the steps of:

positioning an intake cone connected to a vacuum tube in contact with the machined workpiece, the vacuum tube being connected to a vacuum source at a first end of the vacuum tube away from the machined workpiece, the intake cone being connected to the vacuum tube at a second end thereof adjacent to the machined workpiece, the intake cone having a venturi shape, a gas discharge tube projecting into the intake cone, a leading edge, and standoff buttons on the leading edge such that air can flow between the machined workpiece and the leading edge;

directing a stream of ionized gas through the gas discharge tube into honeycomb cavities of the machined workpiece, the stream of ionized gas neutralizing static charges of the particulate matter in the honeycomb cavities;

vibrating the machined workpiece, the vibrating means being in contact with an upper surface of the machined workpiece opposite from the intake cone, the vibration dislodging the particulate matter from the honeycomb cavities; and catching and vacuum pulling the particulate matter from the machined workpiece into the intake cone to thereby remove the particulate matter from the machined workpiece.

13. A system for removing particulate matter from a machined workpiece, the system comprising:

a vacuum source;

a vacuum tube connected to the vacuum source at a first end of the vacuum tube away from the machined workpiece and having an intake cone at a second end of the vacuum tube adjacent to the machined workpiece, the intake cone being in contact with the machined workpiece and having a venturi shape, a gas discharge tube projecting into the intake cone, a leading edge, and standoff buttons on the leading edge such that air can flow between the machined workpiece and the leading edge;

means for directing a stream of ionized gas through the gas discharge tube into honeycomb cavities of the machined workpiece, the stream of ionized gas neutralizing static charges on the particulate matter; and, means for vibrating the machined workpiece, the vibrating means being in contact with an upper surface of the machined workpiece opposite from the intake cone, the vibration dislodging the particulate matter from the machined workpiece, the particulate matter being vacuumed in by the intake cone during operation of the vacuum source and the vibrating means.

14. A method for manufacturing an object free of particulate matter debris, comprising:

positioning a first vacuum inlet in close proximity to a cutting tool of a cutting machine, the first inlet having at least one slot therein for at least partially receiving a portion of the cutting tool therein;

directing a first stream of ionized gas at an area proximate the cutting tool;

catching and vacuum pulling particulate matter cut from the object at the first vacuum inlet to thereby remove particulate matter from the object;

positioning a second vacuum inlet in close proximity to a machined region of the object, the second inlet having an inlet cone, the inlet cone having a bell-mouth shape, a gas tube extending into the inlet cone, the inlet cone having standoff buttons attached to a leading edge of the inlet cone;

directing a second stream of ionized gas through the gas tube to an area proximate the leading edge of the inlet cone;

vibrating the machined region, the vibration dislodging particulate matter from the machined region; and catching and vacuum pulling particulate matter from the machined region at the second vacuum inlet to remove the particulate matter from the machined region.

* * * * *